(12) United States Patent
Su (10) Patent No.: US 7,423,869 B2
(45) Date of Patent: Sep. 9, 2008

(54) HARD DISK DRAWING DEVICE

(75) Inventor: Hsiao-Wei Su, Taichung (TW)

(73) Assignee: Universal Scientific Industrial Co., Ltd. (TW)

( * ) Notice: Subject to any disclaimer, the term of this patent is extended or adjusted under 35 U.S.C. 154(b) by 200 days.

(21) Appl. No.: 11/391,029

(22) Filed: Mar. 28, 2006

(65) Prior Publication Data

US 2007/0230105 A1     Oct. 4, 2007

(51) Int. Cl.
*H05K 5/00* (2006.01)
(52) U.S. Cl. ............. 361/685; 361/727; 312/223.2
(58) Field of Classification Search ............. 361/685, 361/727; 312/223.2
See application file for complete search history.

(56) References Cited

U.S. PATENT DOCUMENTS 5,765,933 A * 6/1998 Paul et al. ............. 312/332.1
6,556,432 B2 * 4/2003 Chen et al. ............. 361/685
6,891,723 B1 * 5/2005 Lin et al. ............. 361/685

\* cited by examiner

*Primary Examiner*—Lisa Lea-Edmonds
*Assistant Examiner*—Ingrid Wright
(74) *Attorney, Agent, or Firm*—Ostrolenk, Faber, Gerb & Soffen, LLP (57) ABSTRACT

A hard disk drawing device includes: a latch seat adapted to be connected to a hard disk; a handle member connected to the latch seat, movable between first and second positions along an axis, and defining a variable line perpendicular to the axis; and a latch member mounted movably on the latch seat and in sliding contact with the handle member in such a manner that movement of the handle member from the first position to the second position results in movement of the latch member from a locked position to an unlocked position along a reference line parallel to the variable line. The variable line is spaced apart from the reference line by a first distance when the handle member is disposed at the first position, and is spaced apart from the reference line by a second distance larger than the first distance when the handle member is disposed at the second position.

7 Claims, 11 Drawing Sheets

HARD DISK DRAWING DEVICE

BACKGROUND OF THE INVENTION

1. Field of the Invention

This invention relates to a hard disk drawing device, more particularly to an easy-to-operate hard disk drawing device.

2. Description of the Related Art

Figure 1:
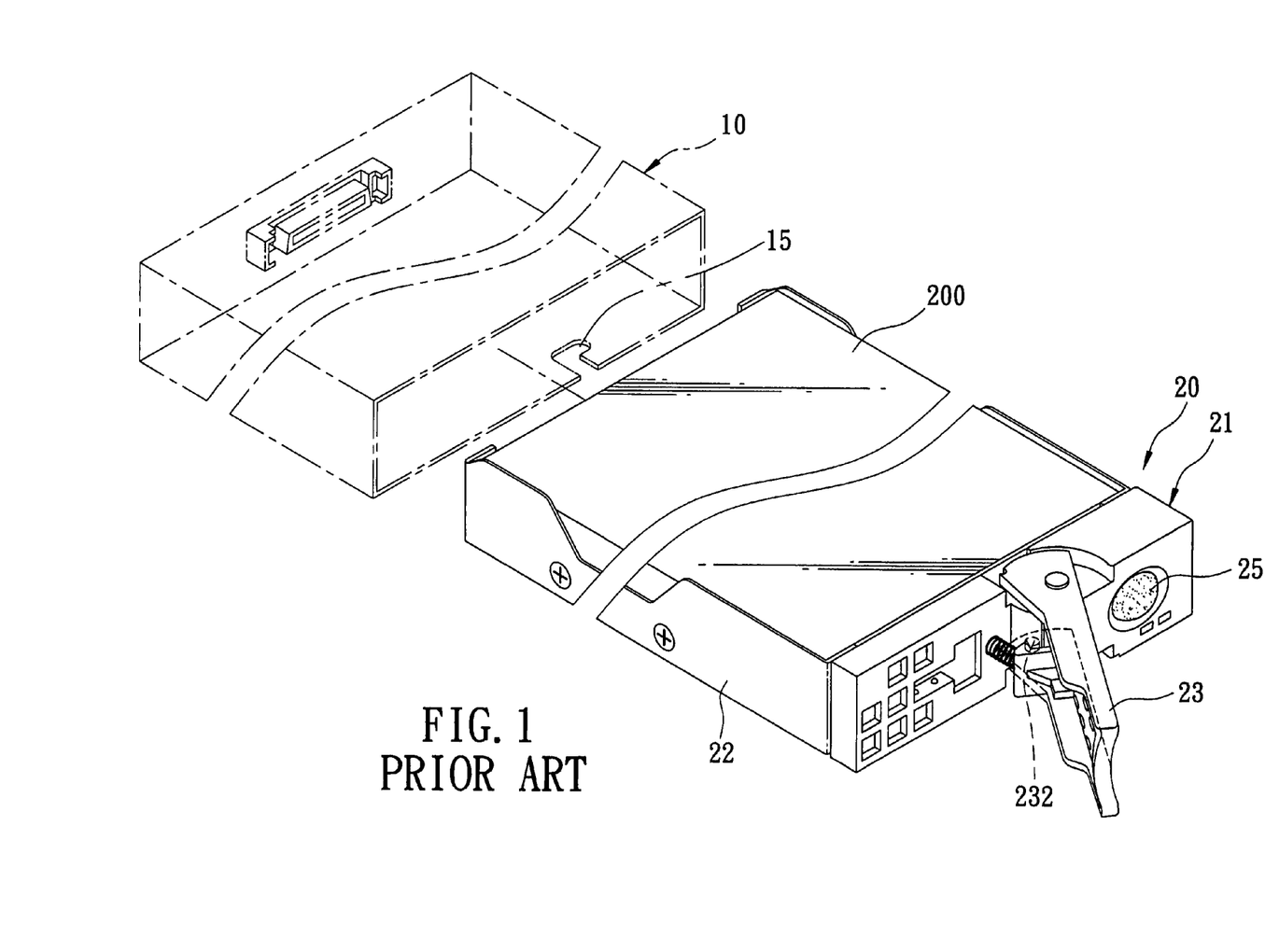
FIG. 1 is a fragmentary perspective view of a conventional removable hard disk device including a hard disk drawing unit, a hard disk, and a case unit.
Figure 2:
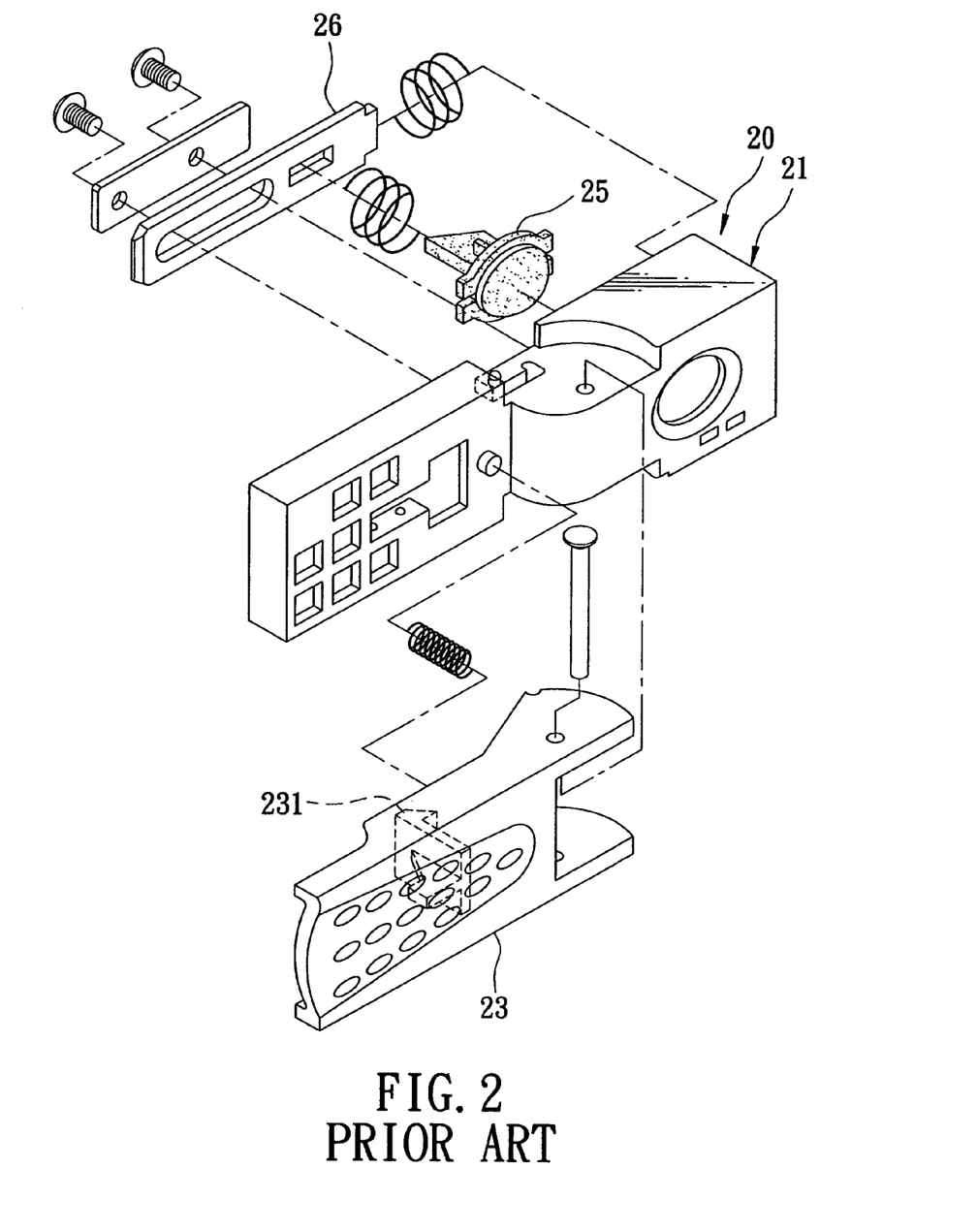
FIG. 2 is an exploded perspective view of the hard disk drawing unit of the conventional removable hard disk device shown in FIG. 1.

As shown in FIGS. 1 and 2, Taiwanese Publication no. 560671 disclosed a removable hard disk device including a case unit 10 and a hard disk drawing unit 20 adapted to mount a hard disk 200 and disposed removably in the case unit 10. The case unit 10 is secured to a computer (not shown), and is formed with an L-shaped notch 15. The hard disk drawing unit 20 includes a front panel 21, a pivot element 23 pivoted to the front panel 21, and a latch plate 26. The front panel 21 includes a button 25 movable between a first position and a second position along a first axis. The latch plate 26 is movable along a second axis perpendicular to the first axis. The pivot element 23 is provided with a hook 231 and a pin 232.

When the button 25 is disposed at the first position, the hook 231 is locked with the latch plate 26, and the pin 232 extends into the L-shaped notch 15, thereby fixing the hard disk drawing unit 20 in the case unit 10. At this state (i.e., a locked state), the button 25 is spaced apart from the latch plate 26 by a first distance. When pressed from the first position to the second position, the button 25 drives the latch plate 26 to move along the second axis to disengage the hook 231, thereby permitting pivoting movement of the pivot element 23 and disengagement between the pin 232 and the L-shaped notch 15, thereby permitting removal of the hard disk drawing unit 20 from the case unit 10. At this state (i.e., an unlocked state), the button 25 is spaced apart from the latch plate 26 by a second distance that is shorter than the first distance.

The aforesaid hard disk device is disadvantageous in that removal of the hard disk drawing unit 20 from the case unit 10 requires push of the button 25 and subsequent pull of the hard disk drawing unit 20, which are relatively inconvenient to conduct.

SUMMARY OF THE INVENTION

Therefore, the object of the present invention is to provide an easy-to-operate hard disk drawing device that can overcome the aforesaid drawback associated with the prior art.

According to this invention, a hard disk drawing device comprises: a latch seat adapted to be connected to a hard disk; a handle member connected to the latch seat, movable between first and second positions along an axis, and defining a variable line perpendicular to the axis; and a latch member mounted movably on the latch seat and in sliding contact with the handle member in such a manner that movement of the handle member from the first position to the second position results in movement of the latch member from a locked position to an unlocked position along a reference line parallel to the variable line. The variable line is spaced apart from the reference line by a first distance when the handle member is disposed at the first position, and is spaced apart from the reference line by a second distance larger than the first distance when the handle member is disposed at the second position.

BRIEF DESCRIPTION OF THE DRAWINGS

Other features and advantages of the present invention will become apparent in the following detailed description of the preferred embodiment of this invention, with reference to the accompanying drawings, in which.

DETAILED DESCRIPTION OF THE PREFERRED EMBODIMENT

Figure 3:
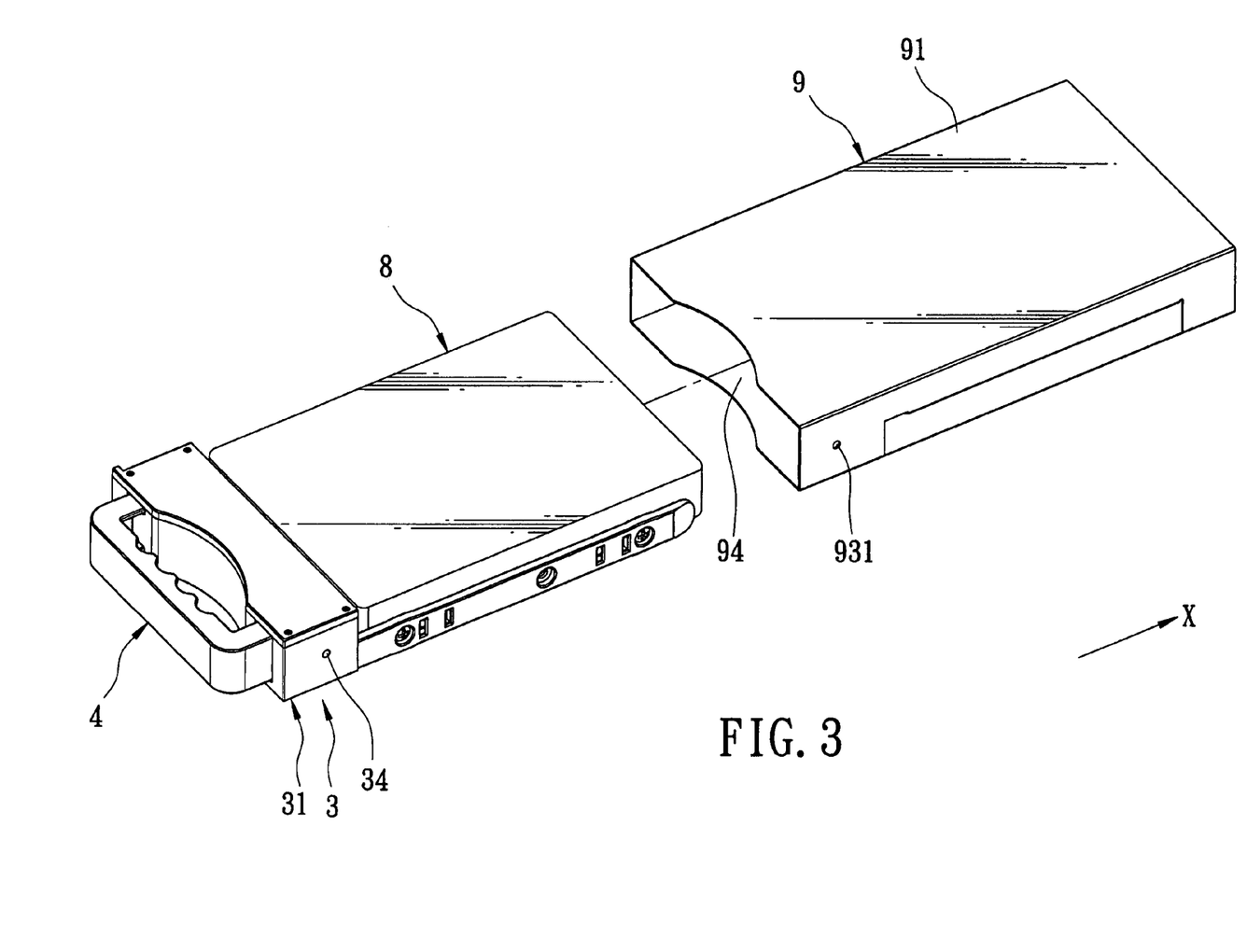
FIG. 3 is an assembled perspective view showing the preferred embodiment of a hard disk drawing device according to this invention which holds a hard disk and which is removed from a case unit.
Figure 4:
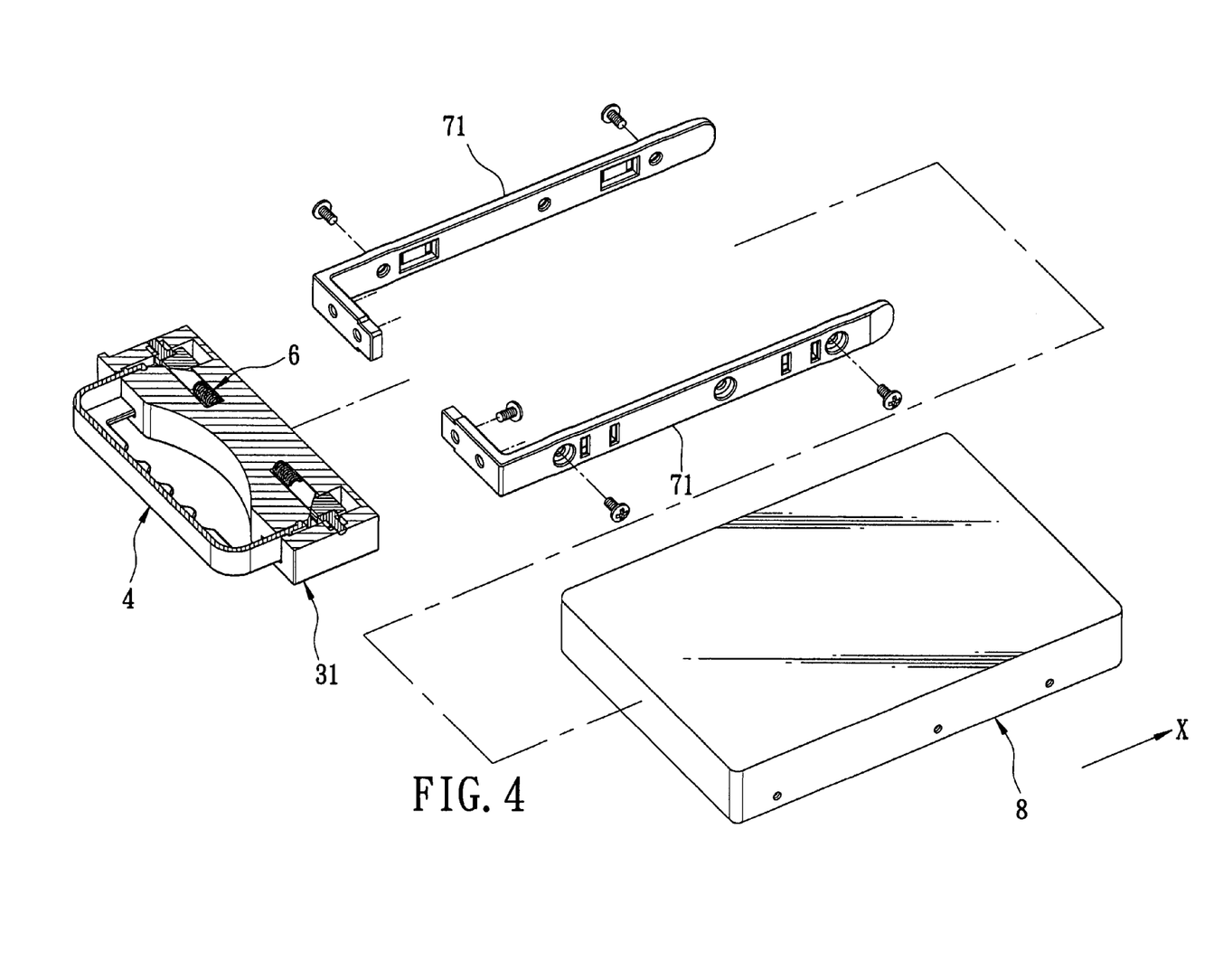
FIG. 4 is an exploded perspective partly sectional view illustrating the structure of the hard disk drawing device of the preferred embodiment and the relationship between the hard disk drawing device and the hard disk.
Figure 5:
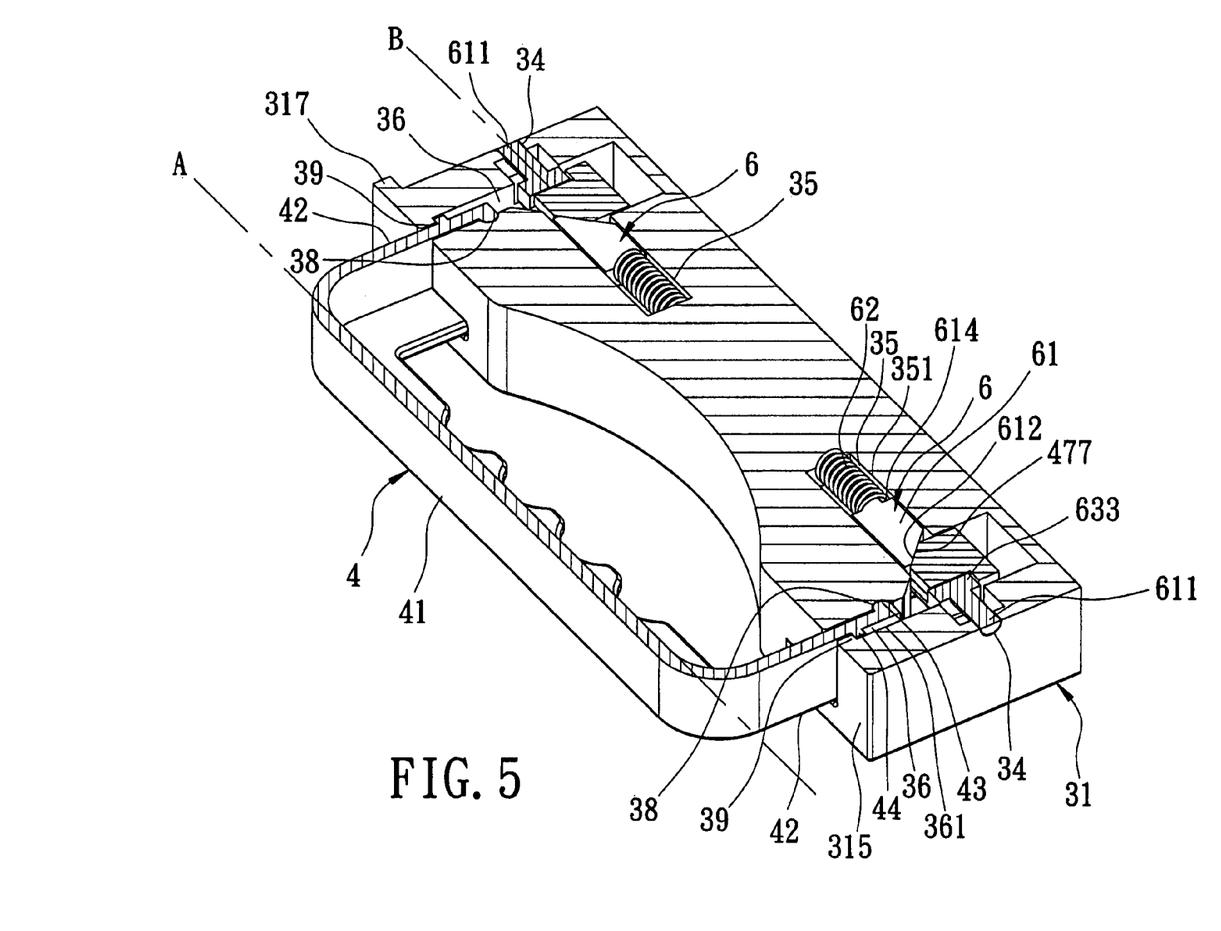
FIG. 5 is an assembled perspective partly sectional view illustrating the relationship among a latch seat, a latch member, and a handle member of the preferred embodiment, in which the latch member is at an unlocked position.

Referring to FIGS. 3 to 5, the preferred embodiment of a hard disk drawing device according to the present invention is shown to include: a latch seat 3 adapted to be connected to a hard disk 8; a handle member 4 connected to the latch seat 3, movable between first and second positions along an axis (X), and defining a variable line (A) perpendicular to the axis (X); and a pair of latch members 6 mounted movably on the latch seat 3 and in sliding contact with the handle member 4 in such a manner that movement of the handle member 4 from the first position to the second position results in movement of each of the latch members 6 from a locked position to an unlocked position along a reference line (B) parallel to the variable line (A). The variable line (A) is spaced apart from the reference line (B) by a first distance when the handle member 4 is disposed at the first position, and is spaced apart from the reference line (B) by a second distance when the handle member 4 is disposed at the second position. The second distance is larger than the first distance.

Figure 6:
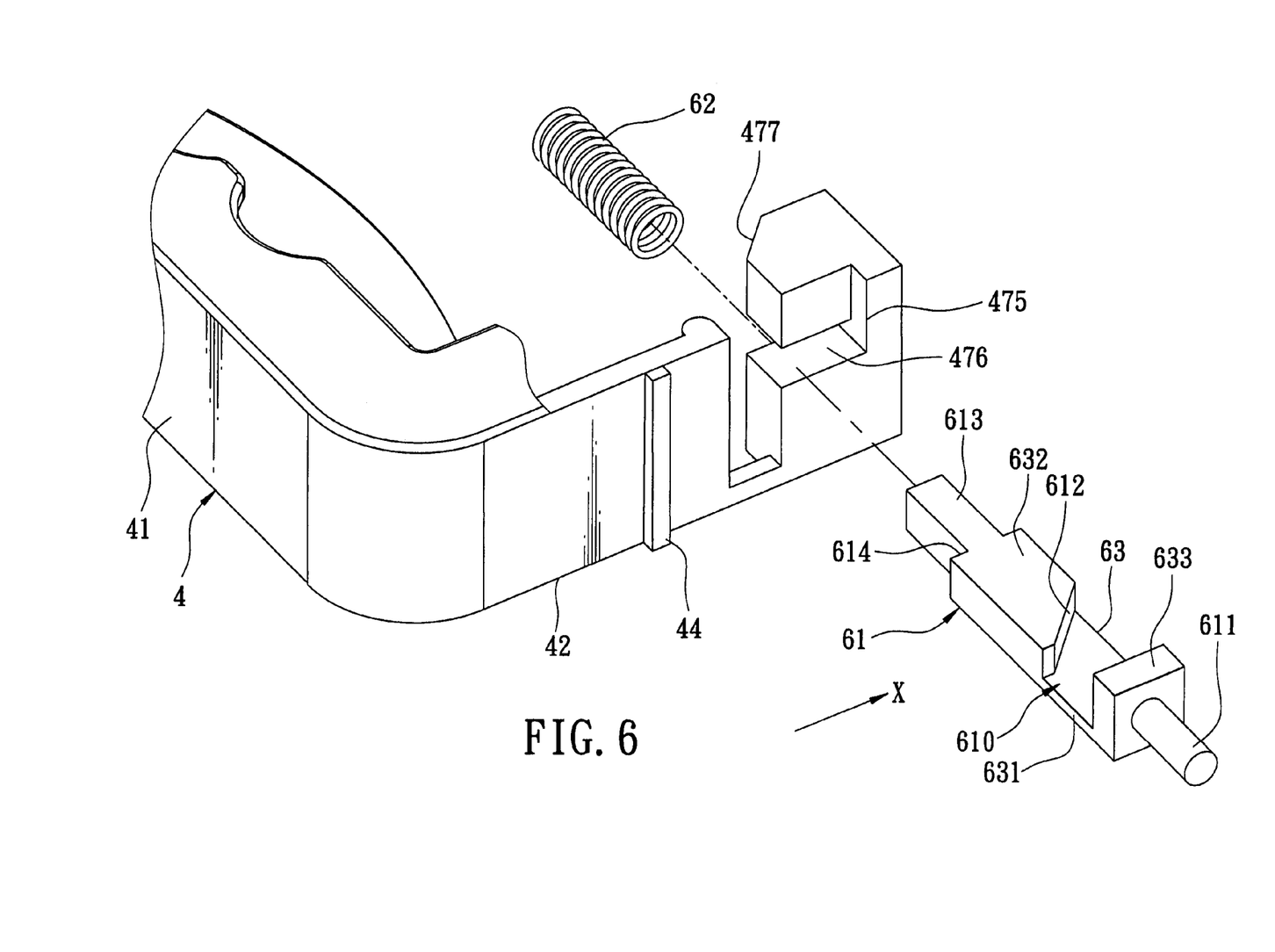
FIG. 6 is a fragmentary exploded perspective view illustrating the relationship between the latch member and the handle member of the preferred embodiment.

As shown in FIGS. 5 and 6, the handle member 4 preferably has a grip portion 41 defining the variable line (A) and having two opposite ends, and arm portions 42 extending transversely from the ends of the grip portion 41, respectively. Each of the arm portions 42 is formed with a first slanted face 477 that is inclined relative to the reference line (B), and a contacting face 475 opposite to the first slanted face 477. Each of the latch members 6 includes a spring-biased bar 61 that extends through the respective arm portion 42 of the handle member 4 in a transverse direction relative to the respective arm portion 42 and that defines a second slanted face 612 which is in sliding contact with the first slanted face 477 of the respective arm portion 42.

Each of the arm portions 42 of the handle member 4 is further formed with a slot 476 for extension of the respective spring-biased bar 61 therethrough. Each of the spring-biased bars 61 is formed with an arm-engaging recess 610 defined by a recess-defining wall 63 having a lateral portion 631 that extends through the respective slot 476 in the arm portion 42 of the handle member 4, and a first transverse portion 632 that extends transversely from the lateral portion 631 and that defines the second slanted face 612. Each of the recess-defining walls 63 further includes a second transverse portion 633 opposite to the first transverse portion 632. In this embodiment, each of the spring-biased bars 61 further includes a pin portion 611 extending from the second transverse portion 633 along the reference line (B), and a sleeved portion 613 extending from the first transverse portion 632 along the reference line (B). The sleeved portion 613 of each spring-biased bar 61 is reduced in cross-section from the respective first transverse portion 632 so as to form a shoulder 614 therebetween. Each of the latch members 6 further includes an urging member 62 sleeved on the sleeved portion 613 of the respective one of the spring-biased bars 61, and abutting against the shoulder 614 of the respective one of the spring-biased bars 61.

As shown in FIG. 5, the latch seat 3 is formed with longitudinal grooves 36 extending parallel to the axis (X) and defined by first groove-defining walls 361. Each of the arm portions 42 of the handle member 4 extends into the respective longitudinal groove 36, and engages releasably the respective first groove-defining wall 361 in a tongue-and-groove engaging manner. Specifically, each of the arm portions 42 of the handle member 4 has a curved positioning protrusion 43. Each of the first groove-defining walls 361 is formed with a curved blind hole 38 corresponding to the curved positioning protrusion 43 of the respective arm portion 42. The curved positioning protrusion 43 of each arm portion 42 engages the curved blind hole 38 in the respective first groove-defining wall 361 when the handle member 4 is disposed at the second position.

Moreover, the latch seat 3 is formed with two transverse grooves 35 extending along the reference line (B) and defined by second groove-defining walls 351. Each of the latch members 6 is disposed in the respective transverse groove 35. The urging member 62 of each of the latch members 6 has two opposite ends abutting against the respective shoulder 614 and the respective second groove-defining wall 351, respectively (see FIG. 5).

The latch seat 3 has a front end 315 formed with stoppers 39. Each of the arm portions 42 of the handle member 4 is further formed with a protrusion 44 that abuts against the respective stopper 39 when the handle member 4 is disposed at the second position. The latch seat 3 further includes two side walls 31, each of which is formed with a through hole 34 for extension of the respective one of the pin portions 611 of the spring-biased bars 61 therethrough. In addition, one of the side walls 31 includes a limiting stopper 317 so as to prevent the hard disk drawing device from being inadequately and excessively inserted in the case unit 9.

As shown in FIG. 4, the hard disk drawing device further includes a pair of opposing fastening plates 71 extending from the latch seat 3 in a direction parallel to the axis (X), and adapted to hold the hard disk 8 therebetween.

Figure 7:
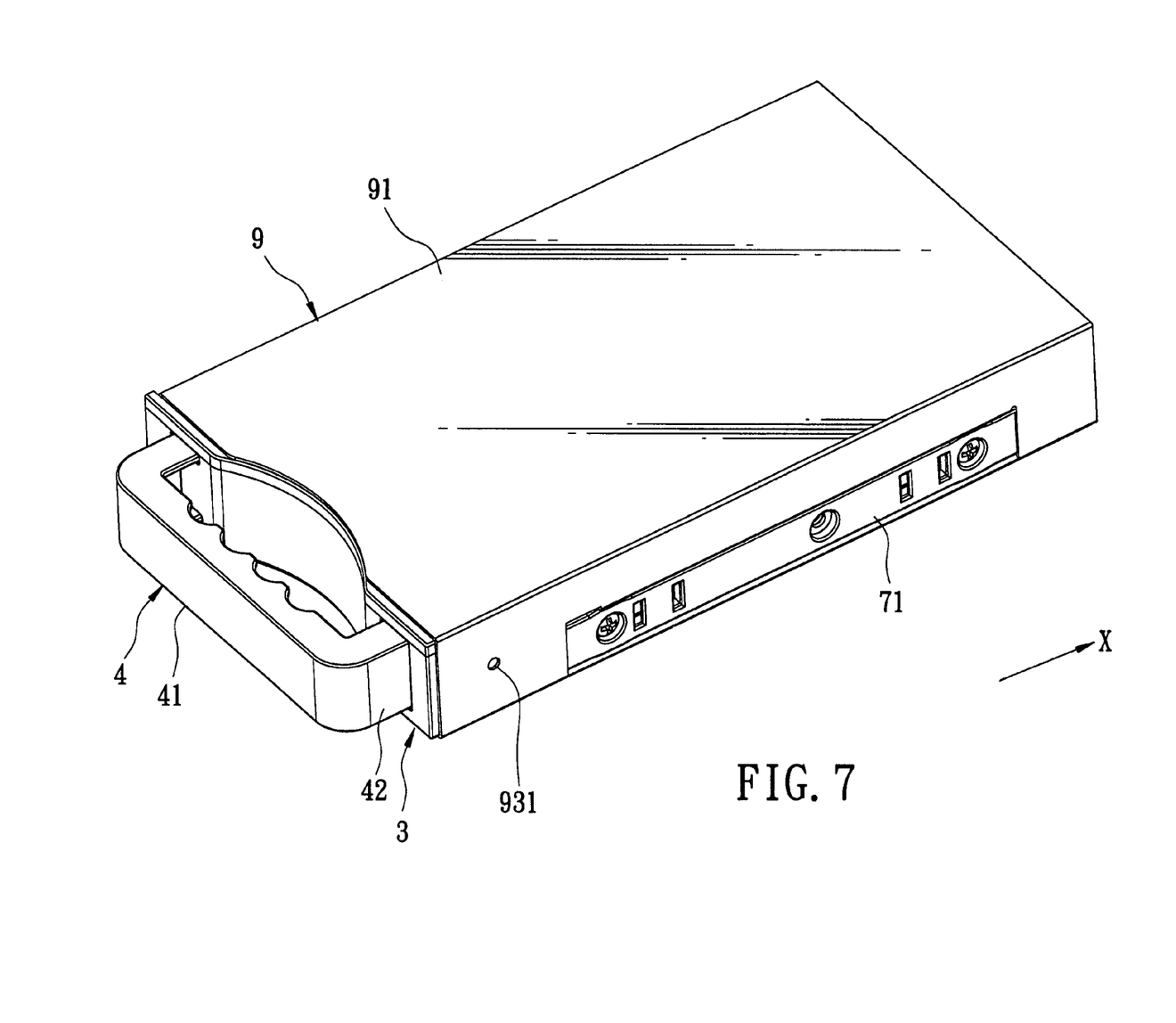
FIG. 7 is an assembled perspective view showing the preferred embodiment of the hard disk drawing device fixed to the case unit, in which the latch member is disposed at the unlocked position.
Figure 8:
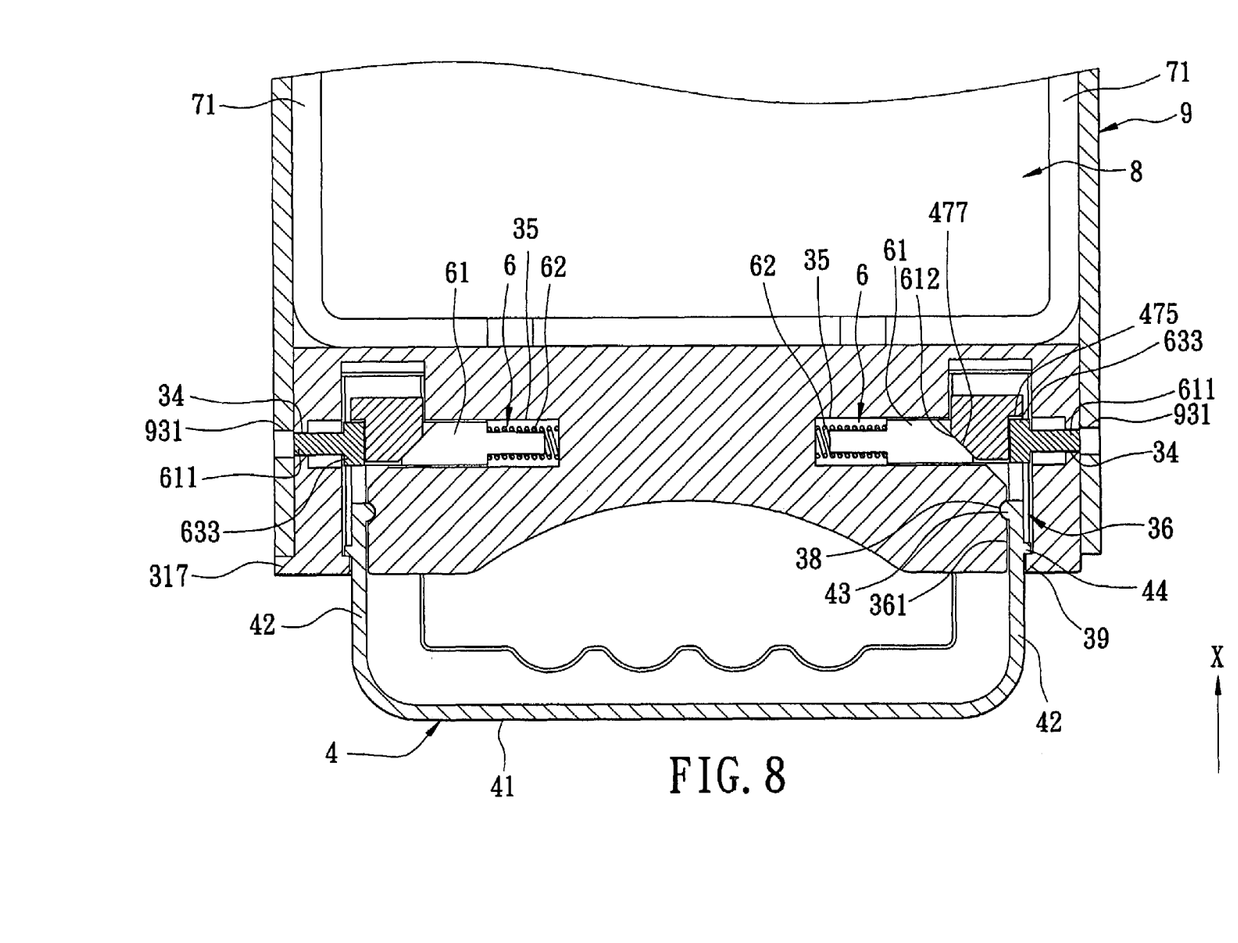
FIG. 8 is a fragmentary partly sectional view illustrating the preferred embodiment of the hard disk drawing device at the unlocked state.
Figure 9:
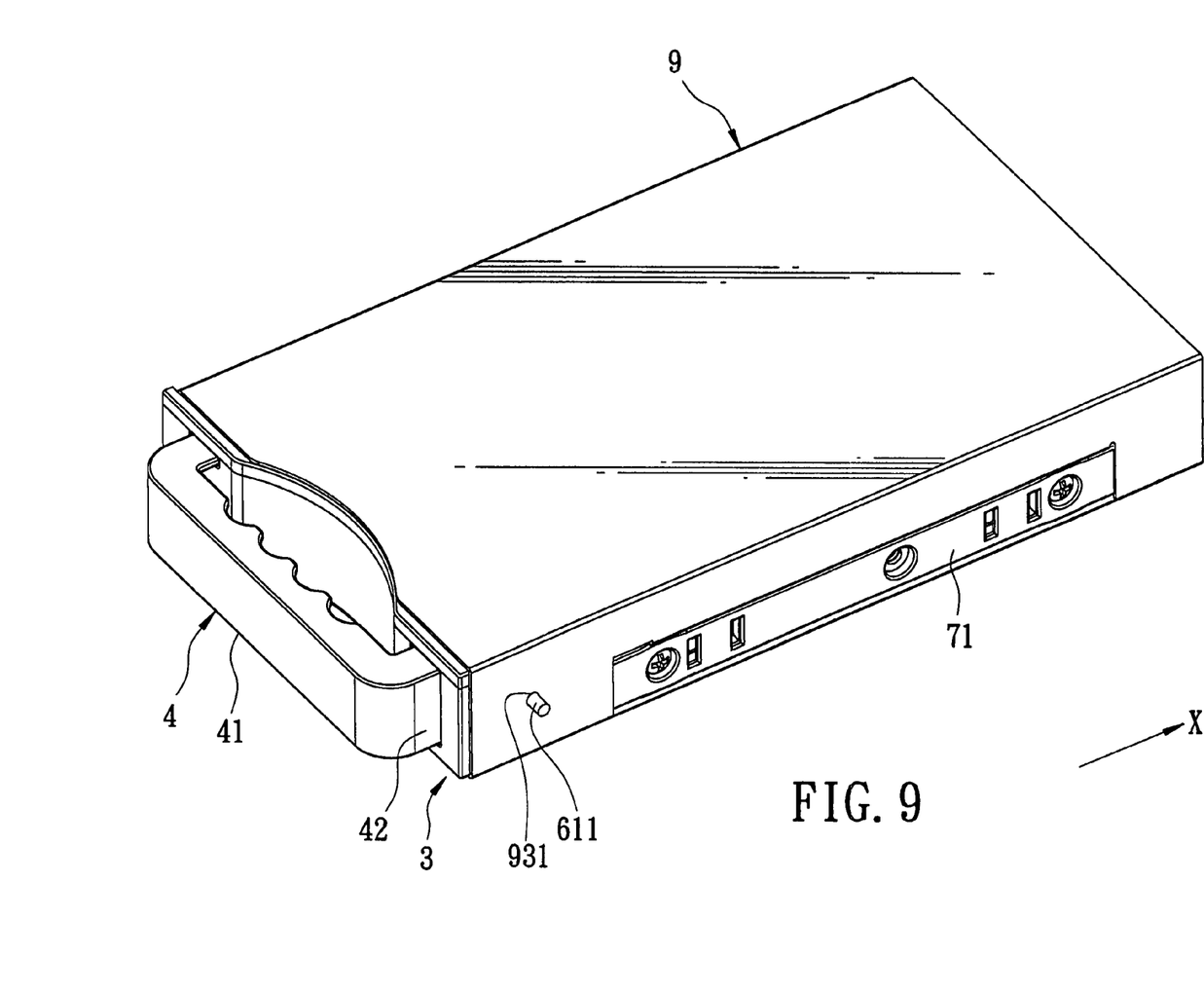
FIG. 9 is a perspective view showing the preferred embodiment of the hard disk drawing device fixed to the case unit, in which the latch member is disposed at a locked position.
Figure 10:
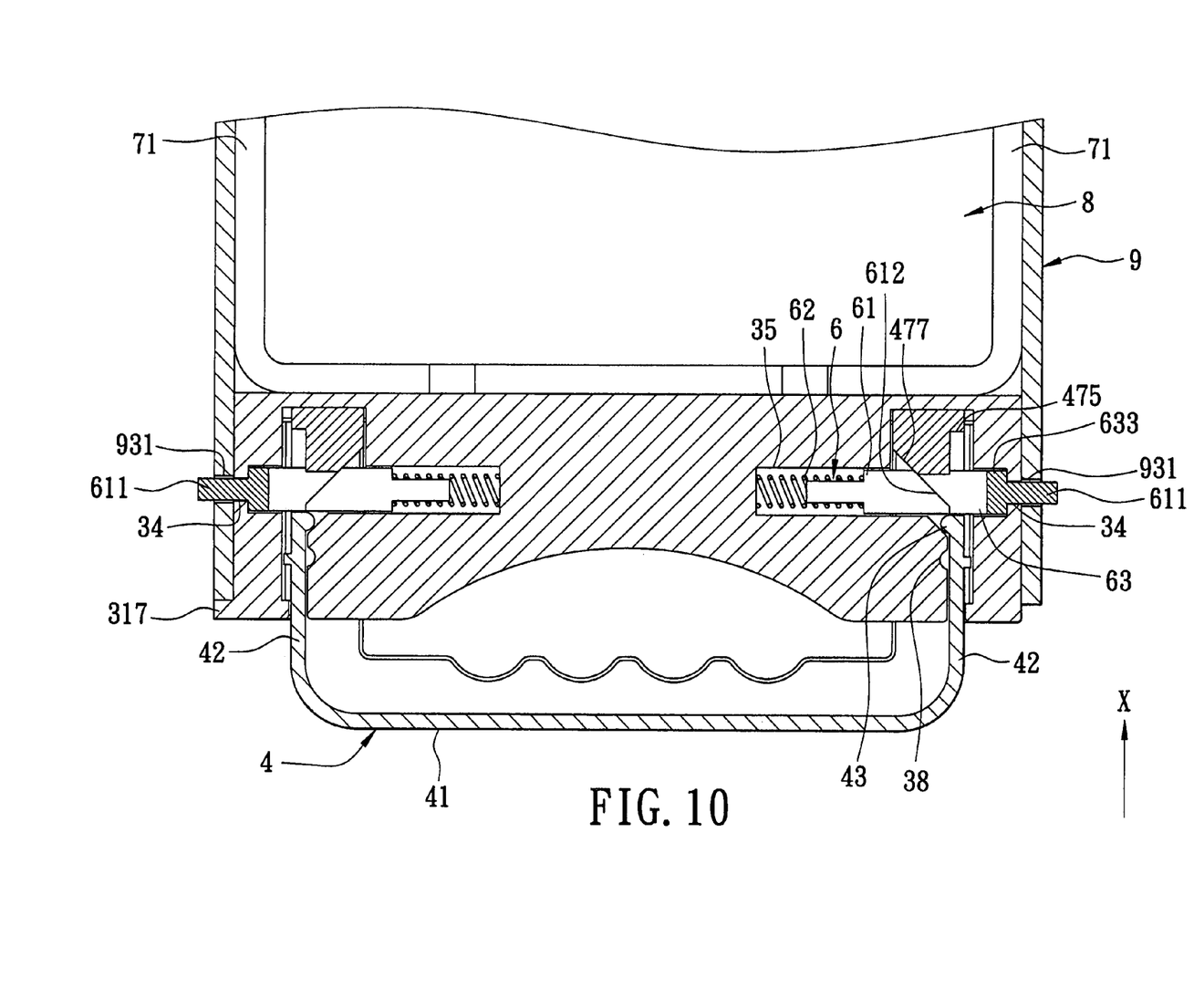
FIG. 10 is a fragmentary partly sectional view illustrating the preferred embodiment of the hard disk drawing device at the locked state.
Figure 11:
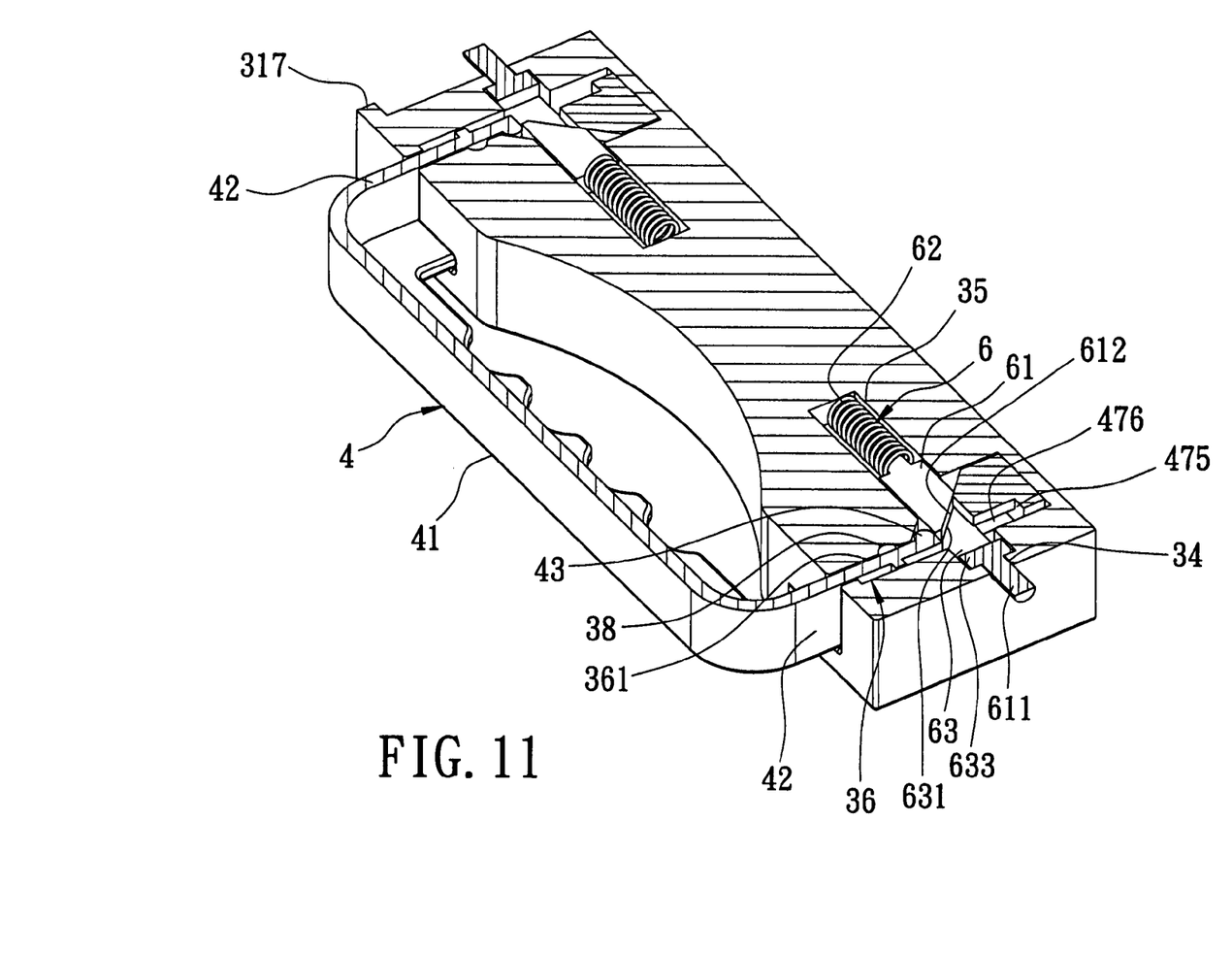
FIG. 11 is an assembled perspective partly sectional view illustrating the relationship among the latch seat, the latch member, and the handle member, in which the latch member is at the locked position.

In use, the hard disk drawing device is inserted into a case unit 9 that is secured in a computer (not shown). As shown in FIG. 3, the case unit 9 has an outer wall 91 that defines an inner space 94 for accommodating an assembly of the hard disk drawing device and the hard disk 8, and that is formed with two positioning holes 931 corresponding to the through holes 34 of the latch seat 3. When the hard disk 8 is to be mounted in the computer, the handle member 4 is required to be moved to the second position, where each of the curved positioning protrusions 43 engages the respective curved blind hole 38 and each of the protrusions 44 abuts against the respective stopper 39, so that the latch members 6 can be moved to the unlocked position, where each of the first slanted faces 477 pushes the respective second slanted face 612 against the urging force of the respective urging member 62 and each of the second transverse portions 633 contacts the respective contacting face 475 (see FIGS. 3, 5 and 8), before inserting the assembly of the hard disk drawing device and the hard disk 8 into the case unit 9. After inserting the assembly of the hard disk drawing device and the hard disk 8 into the case unit 9 in the computer, the handle member 4 is forced to move to the first position by overcoming the friction force between the curved positioning protrusions 43 and the first groove-defining walls 361 at the curved blind holes 38. At this position, each of the curved positioning protrusions 43 disengages the respective curved blind hole 38 and each latch member 6 is moved toward the case unit 9 by the urging action of the respective urging member 62 such that each of the pin portions 611 of the spring-biased bars 61 automatically protrudes through the respective through hole 34 of the latch seat 3 and the respective positioning hole 931 of the case unit 9, i.e., the locked position (see FIGS. 9 to 11), thereby fixing the assembly of the hard disk drawing device and the hard disk 8 in the case unit 9. When the hard disk 8 is to be removed from the computer, the handle member 4 is pulled from the first position to the second position such that the pin portions 611 are retracted from the through holes 34 of the latch seat 3 and the positioning holes 931 of the case unit 9, respectively (see FIG. 7), and is further pulled to remove the assembly of the hard disk drawing device and the hard disk 8 from the case unit 9 (see FIG. 3).

According to the present invention, since removal of the assembly of the hard disk drawing device and the hard disk 8 from the computer can be achieved by solely a pulling operation, the removal operation is easier than that of the aforesaid conventional hard disk drawing device including pushing and pulling operations.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A hard disk drawing device comprising:
   a latch seat adapted to be connected to a hard disk;
   a handle member connected to said latch seat, movable between first and second positions along an axis, and defining a variable line perpendicular to said axis; and
   a latch member mounted movably on said latch seat, the latch member being adapted to detachably lock the hard disk drawing device and the hard disk to a case unit secured in a computer and being in sliding contact with said handle member in such a manner that movement of said handle member from said first position to said second position results in movement of said latch member from a locked position, locking the hard disk drawing device and the hard disk in the case unit, to an unlocked position, unlocking the hard disk drawing device and the hard disk from the case unit, the movement of said latch member being along a reference line parallel to said variable line;

wherein said variable line is spaced apart from said reference line by a first distance when said handle member is disposed at said first position, and is spaced apart from said reference line by a second distance when said handle member is disposed at said second position; and wherein said second distance is larger than said first distance, the hard disk drawing device being structured such that pulling alone on the handle member will remove the hard disk drawing device and the hard disk from the computer.

2. The hard disk drawing device of claim 1, wherein said handle member has a grip portion defining said variable line, and an arm portion extending transversely from said grip portion and formed with a first slanted face that is inclined relative to said reference line, said latch member including a spring-biased bar that extends through said arm portion of said handle member in a transverse direction relative to said arm portion and that defines a second slanted face which is in sliding contact with said first slanted face.

3. The hard disk drawing device of claim 2, wherein said arm portion of said handle member is further formed with a slot for extension of said spring-biased bar therethrough.

4. The hard disk drawing device of claim 3, wherein said spring-biased bar is formed with an arm-engaging recess defined by a recess-defining wall having a lateral portion that extends through said slot in said arm portion of said handle member, and a transverse portion that extends transversely from said lateral portion and that defines said second slanted face.

5. The hard disk drawing device of claim 2, wherein said latch seat is formed with a longitudinal groove extending parallel to said axis and defined by a groove-defining wall, said arm portion of said handle member extending into said longitudinal groove and engaging releasably said groove-defining wall in a tongue-and-groove engaging manner.

6. The hard disk drawing device of claim 2, wherein said latch seat has a front end formed with a stopper, said arm portion of said handle member being further formed with a protrusion that abuts against said stopper when said handle member is disposed at said second position.

7. The hard disk drawing device of claim 1, further comprising a pair of opposing fastening plates extending from said latch seat in a direction parallel to said axis, and adapted to hold the hard disk therebetween.

* * * * *